(12) United States Patent
Morey

(10) Patent No.: US 7,614,873 B1
(45) Date of Patent: Nov. 10, 2009

(54) MOLD BASE HOLD RETAINER

(75) Inventor: Norman Edward Morey, North Branch, MI (US)

(73) Assignee: Custom Products Enterprises, Inc., Grand Blanc, MI (US)

( * ) Notice: Subject to any disclaimer, the term of this patent is extended or adjusted under 35 U.S.C. 154(b) by 233 days.

(21) Appl. No.: 11/712,201

(22) Filed: Feb. 27, 2007

Related U.S. Application Data

(63) Continuation-in-part of application No. 11/606,519, filed on Nov. 29, 2006, now abandoned.

(51) Int. Cl.
*B29C 45/00* (2006.01)
(52) U.S. Cl. .................... 425/595; 425/451.9
(58) Field of Classification Search ............. 425/192 R, 425/589, 595, 451.9
See application file for complete search history.

(56) References Cited

U.S. PATENT DOCUMENTS

| | | | |
|---|---|---|---|
| 3,706,116 A | 12/1972 | Drazick | |
| 3,737,268 A | 6/1973 | Ryder | |
| 3,844,703 A | 10/1974 | Hutter | |
| 3,945,620 A | 3/1976 | Ruegg | |
| 4,403,810 A | 9/1983 | Bieneck | |
| 4,704,078 A | 11/1987 | Hehl | |
| 4,765,585 A | 8/1988 | Wieder | |
| 5,114,329 A * | 5/1992 | Nakamura et al. | 425/190 |
| 5,397,226 A | 3/1995 | Vandenberg | |
| 5,494,435 A | 2/1996 | Vandenberg | |
| 6,116,891 A | 9/2000 | Starkey | |
| 6,431,852 B1 | 8/2002 | Vandenberg | |
| 6,491,512 B2 | 12/2002 | Vandenberg | |
| 6,921,256 B2 | 7/2005 | Bokich | |
| 7,229,269 B2 | 6/2007 | Cerniglia | |

(Continued)

FOREIGN PATENT DOCUMENTS

EP 1 619 412 A1 1/2006

(Continued)

OTHER PUBLICATIONS

An 8 page PDF file from an online catalog published by Progressive Comp. DME Corp. in 2007 @ http://www.procomps.com.

(Continued)

*Primary Examiner*—Maria Veronica D Ewald
(74) *Attorney, Agent, or Firm*—T. L. Garrett, PLC; Tanya L. Garrett

(57) ABSTRACT

One embodiment of a locking device for first and second mold plates of an injection molding machine comprises a base attached to the first mold plate, the base having first and second bores extending therethrough, the first and second bores having first and second bore centerlines, respectively, wherein the first bore centerline substantially intersects the second bore centerline, an actuator having an actuator first end, wherein the actuator is within the first bore, a member which at least partly covers the first bore, a biasing element between the actuator and the member, a block attached to the second mold plate, the block having a projection with projection first and second ends and a projection longitudinal axis, wherein the projection first end is substantially rigidly connected to the block, wherein the projection second end fits within the second bore, the projection second end comprising a projection contact surface.

20 Claims, 8 Drawing Sheets

U.S. PATENT DOCUMENTS

2004/0178536 A1     9/2004   Kato et al.
2005/0266111 A1*   12/2005   Ciccone et al. ......... 425/192 R
2007/0087081 A1*    4/2007   Ichikawa .................... 425/595

FOREIGN PATENT DOCUMENTS

GB          658488       10/1951
JP          2001038435    2/2001
WO    WO 2004/097257   11/2004

OTHER PUBLICATIONS 2 pages from Progressive Components International Corporation entitled "Progressive Components Introduces New Roller Pullers TM for Parting Line Sequencing" from a Jun. 6, 2007 publication.

* cited by examiner

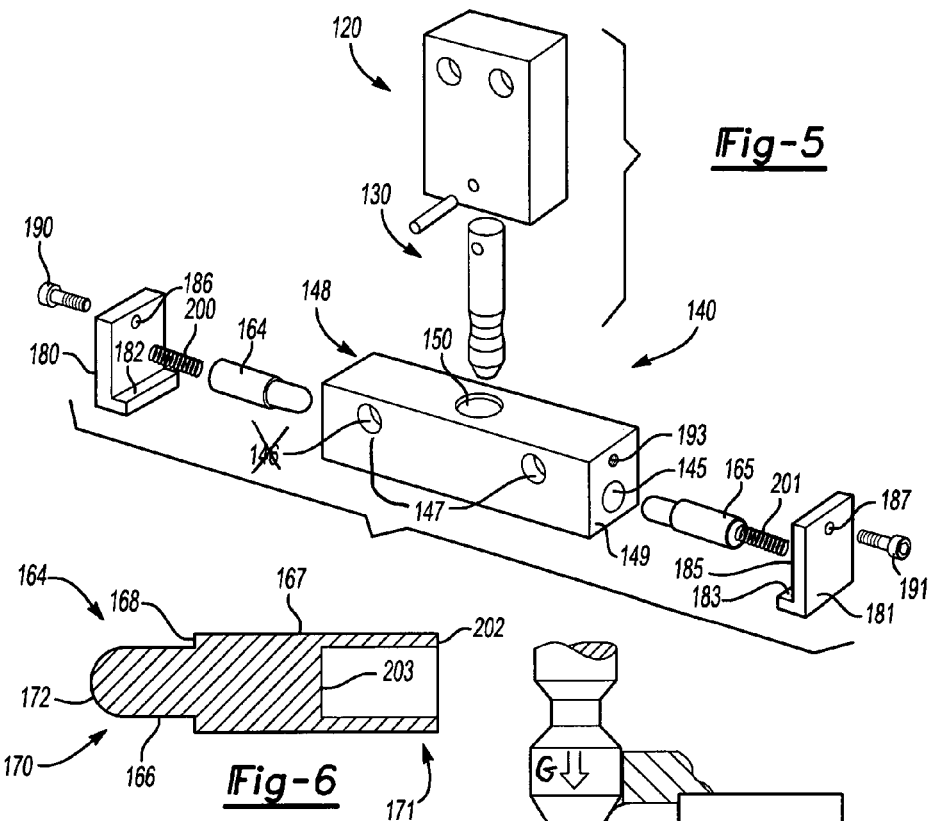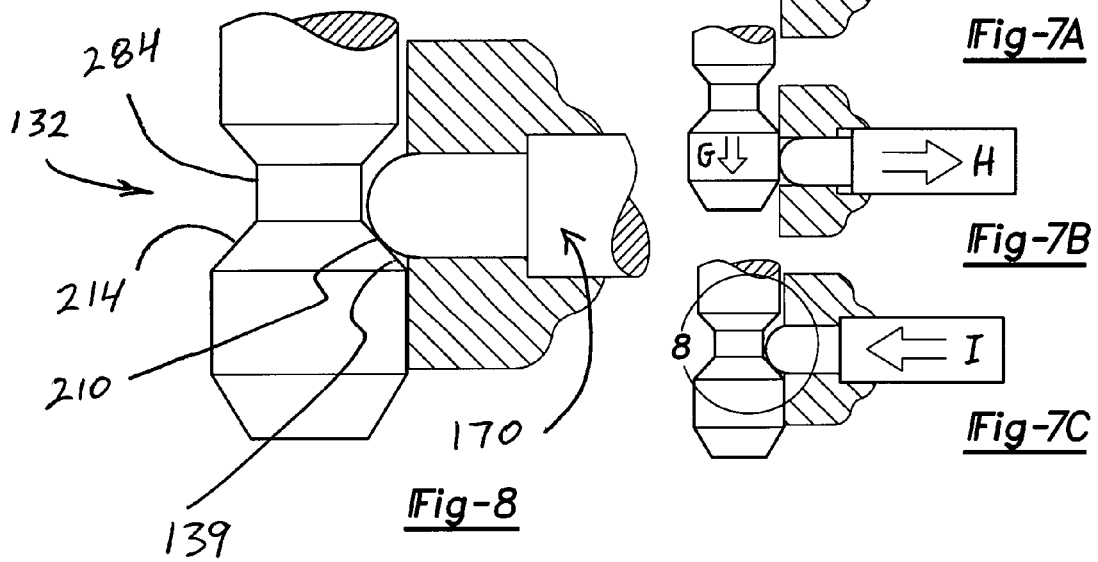

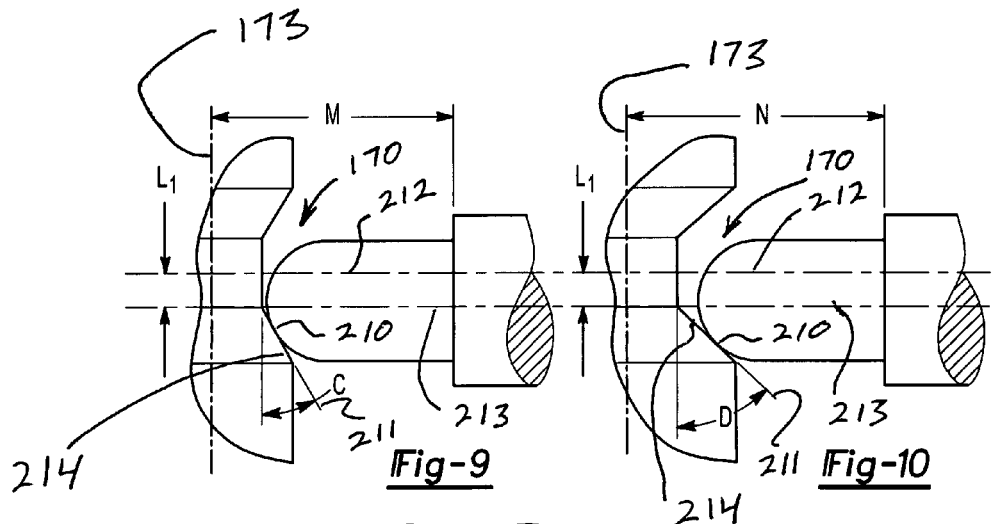
Fig-9
Fig-10
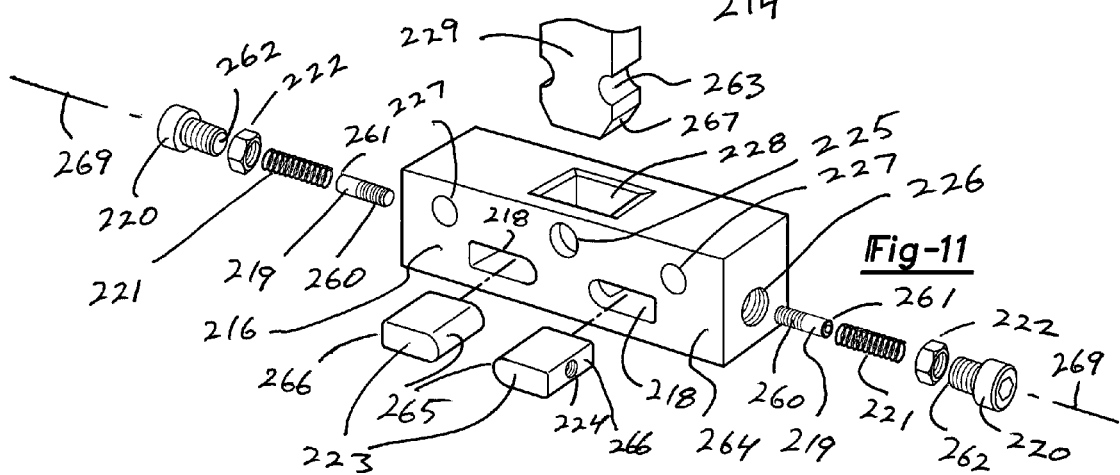
Fig-11
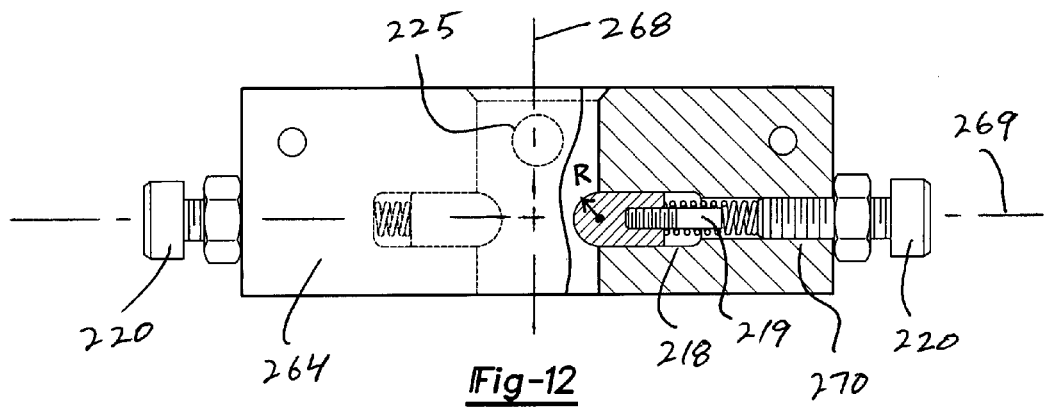
Fig-12

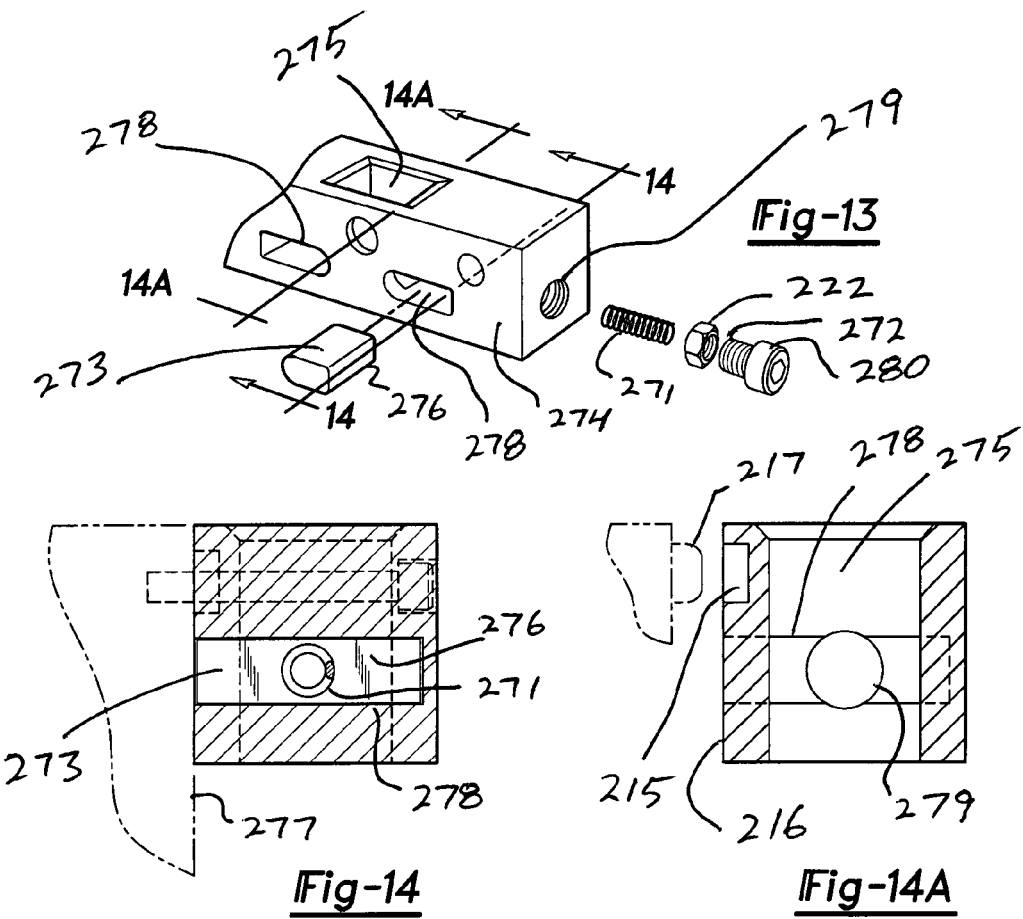
Fig-13
Fig-14
Fig-14A
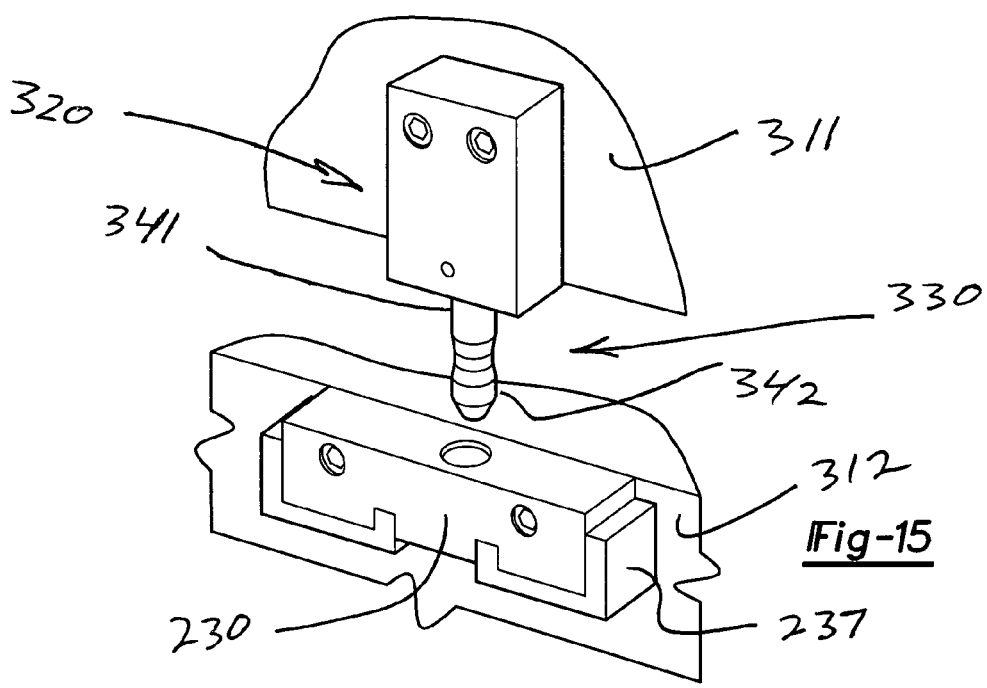
Fig-15

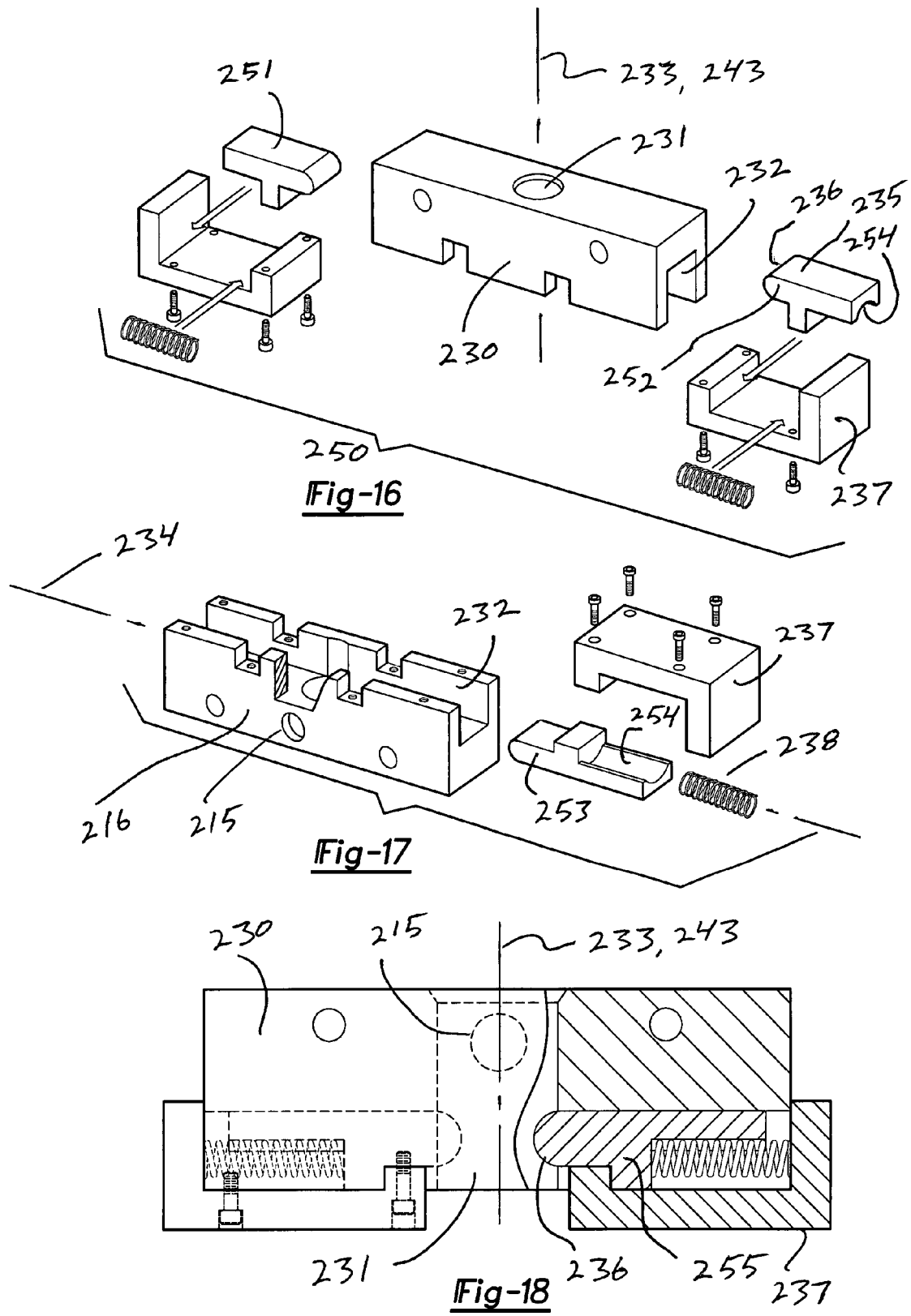

MOLD BASE HOLD RETAINER

CROSS-REFERENCE TO RELATED APPLICATIONS

This utility patent application is a continuation-in-part of previously filed U.S. Nonprovisional Patent Application No. 11/606,519, filed on Nov. 29, 2006 now abandoned. Nonprovisional Patent Application No. 11/606,519 is incorporated herein by reference in its entirety.

STATEMENT AS TO THE RIGHT TO INVENTIONS MADE UNDER FEDERALLY SPONSORED RESEARCH AND DEVELOPMENT

Not applicable.

TECHNICAL FIELD

This invention relates to injection molding machines, and more specifically to locking devices which affect the opening and closing of mold plates for injection molding machines.

BACKGROUND OF THE INVENTION

FIGS. 1-2 depict a prior art locking device 10 for an injection molding machine (not shown) having upper and lower mold plates 11, 12, respectively. Locking device 10 includes a base 40 having a longitudinal axis (not shown) and a vertical axis 74. Base 40 is attached to lower mold plate 12. This is accomplished via socket head cap screws 60, 61 which fit inside countersunk clearance holes 46, 47 of the base. The cap screws are then tightened appropriately. To assist with proper location of the base on the lower mold plate, locating pins 62, 63, projecting away from back surface 43, are mounted to the base. During installation of the base, locating pins 62, 63 are received by corresponding blind holes (not shown) in the lower mold plate. Base 40 has hole 52 extending therethrough. Hole 52 has hole centerline 72 which is substantially parallel to the longitudinal axis of the base. Hole 52 is at least partially threaded, as shown at 53.

Internal slots 54, 55 (having inner limits 58, 59 and outer limits 56, 57, respectively) are aligned with hole 52. Internal slots 54, 55 intersect both hole 52 and rectangular opening 50. The internal slots guide the axial displacement of cylindrical elements 64, 65 substantially in-line with hole centerline 72 during movement of rectangular projection 30 of block 20 into and out of rectangular opening 50 (as explained further below).

Rectangular opening 50 is substantially parallel to vertical axis 74, and has a chamfered surface 51. Holes 48, 49 in front surface 42 of the base are used for installing cylindrical elements 64, 65 into the internal slots of the base. Biasing elements 66, 67 are within hole 52, captured between is elements 64, 65 and adjustment screws 70, 71, respectively. Lock nuts 68, 69 keep adjustment screws 70, 71 from loosening during operation of the injection molding machine in order to maintain a force on the cylindrical elements that is directed towards vertical axis 74.

Block 20 is attached to upper mold plate 11. This is accomplished via socket head cap screws 27, 28 which fit inside countersunk clearance holes 24, 25 of the block. The cap screws are then tightened appropriately. To assist with proper location of the block on the upper mold plate, a locating pin 29 projecting away from back surface 23 is mounted within through hole 26 of the block. During installation of the block, locating pin 29 is received by a corresponding blind hole (not shown) in the upper mold plate. Block 20 has a rectangular projection 30 which extends perpendicularly away from lower surface 21 and fits into rectangular opening 50 of the base when locking device 10 is in a locked position (not shown). Rectangular projection 30 has a projection longitudinal axis 73. Together, upper and lower mold plates 11, 12 form a mold. In the locked position, the upper and lower mold plates are substantially in contact due to the injection molding machine's closing of the mold. The upper and lower mold plates remain in contact until a selected point of the injection molding cycle is reached when it is desirable to eject the molded part. Prior to or simultaneously with ejection, the die lock releases one mold plate from the other so that displacement of one plate relative to the other and ejection may occur. When the selected point is reached, a "hard stop" in the die assembly is encountered (at a selected displacement of the mold plates). Here, the force created as the mold plates begin to separate and rectangular projection 30 begins to retract from base 40 causes the spring-loaded cylindrical elements to separate from pair of semicircular features 32 of rectangular projection 30, which unlocks the device. The rectangular projection is then withdrawn from the rectangular opening of the base by the continuing motion of the upper plate away from the lower plate.

SUMMARY OF THE INVENTION

The prior art device of FIGS. 1-2 is not specifically designed to tensiley preload rectangular projection 30. Rather, cylindrical elements 64, 65 are intended to align centrally with semicircular features 32 when the prior art device first locks. As a result, rectangular projection 30 is not tensiley preloaded when the device first locks. Furthermore, if the semicircular features of rectangular projection 30 happen to fall within a tolerance which places them a distance somewhat further from block 20 than desired, the prior art device will have a tendency to hold the mold plates less securely together, or even cause a gap to exist between the plates. Therefore the prior art device is not specifically designed to urge the rectangular projection further into rectangular bore 50. The invention overcomes these disadvantages by providing tensilely preloaded engagement of the projection after the device locks and before the locked mold plates begin moving in the opposite direction, so that "play" in the device is minimized, and that the mold plates are held together more securely than when an actuator engages a groove without tensiley preloading its projection.

One embodiment of a locking device for first and second mold plates of an injection molding machine comprises a base attached to the first mold plate, the base having first and second bores extending therethrough, the first and second bores having first and second bore centerlines, respectively, wherein the first bore centerline substantially intersects the second bore centerline, an actuator having an actuator first end, wherein the actuator is within the first bore, a member which at least partly covers the first bore, a biasing element between the actuator and the member, a block attached to the second mold plate, the block having a projection with projection first and second ends and a projection longitudinal axis, wherein the projection first end is substantially rigidly connected to the block, wherein the projection second end fits within the second bore, the projection second end comprising a projection contact surface.

BRIEF DESCRIPTION OF THE FIGURES

FIG. 5 is an exploded view of the present invention.

FIG. 6 is a sectional side view for an actuator of the present invention.

FIG. 7A is a partly-sectional side view for selected components of the present invention in a first unlocked position.

FIG. 7B is a partly-sectional side view for selected components of the present invention in a second unlocked position.

FIG. 7C is a partly-sectional side view for selected components of the present invention in a locked position.

FIG. 8 is an enlarged partly-sectional side view for selected components of the present invention in the locked position of FIG. 7C.

FIG. 9 is an enlarged side view for selected components of the present invention in a first locked position.

FIG. 10 is an enlarged side view for selected components of the present invention in a second locked position.

FIG. 11 is an exploded back view for another embodiment of the present invention.

FIG. 12 is a partly-sectional front view of the embodiment of FIG. 11 in an unlocked position.

FIG. 13 is an exploded partial view for yet another embodiment of the present invention.

FIG. 14 is a sectional view for the embodiment of FIG. 13 as seen along line 14-14.

FIG. 14A is a sectional view for the embodiment of FIG. 13 as seen along line 14A-14A.

FIG. 15 is an isometric view for yet another embodiment of the present invention in an unlocked position.

FIG. 16 is an exploded view for selected components of the embodiment of FIG. 15.

FIG. 17 is another exploded view for selected components of the embodiment of FIG. 15.

FIG. 18 is a partly-sectional front view for the embodiment of FIG. 15 in an unlocked position.

DESCRIPTION OF THE PREFERRED EMBODIMENT

Figure 1:
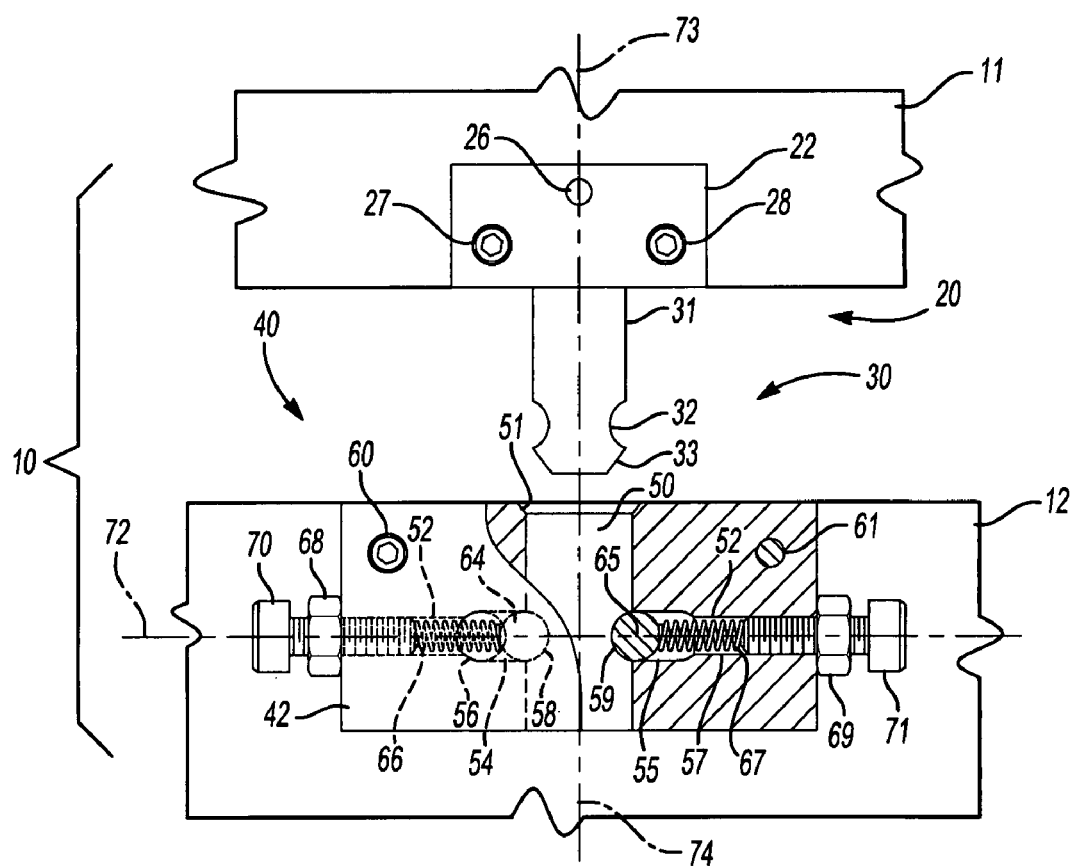
FIG. 1 is a partly-sectional front view of a prior art locking device in an unlocked position.
Figure 2:
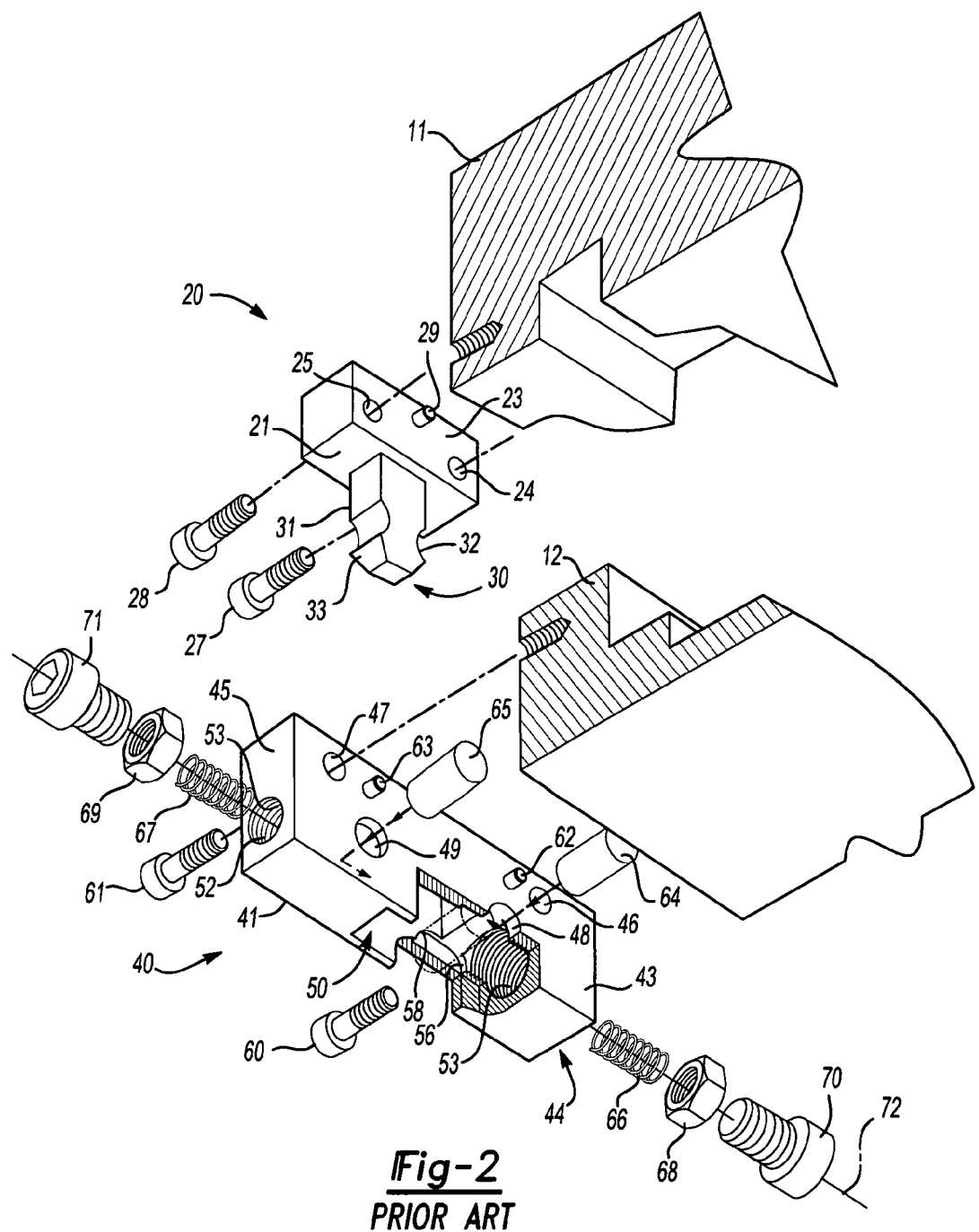
FIG. 2 is an exploded view, partly in section, of the prior art device of FIG. 1.
Figure 4:
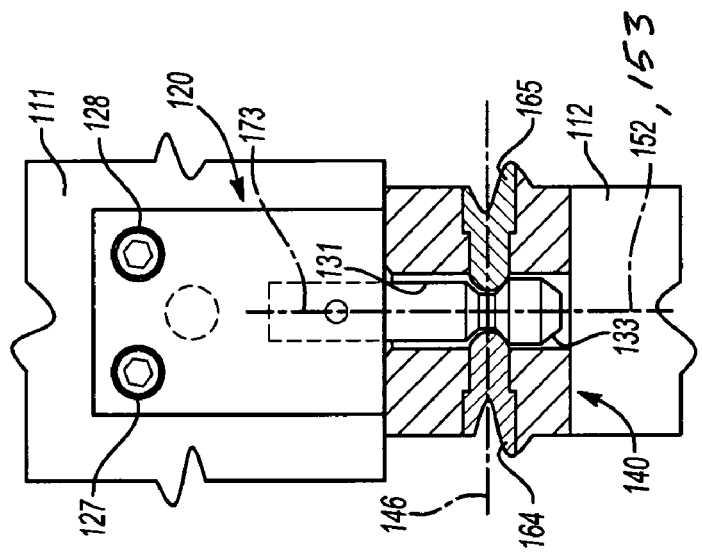
FIG. 4 is a partly-sectional front view of the present invention in a locked position.
Figure 3:
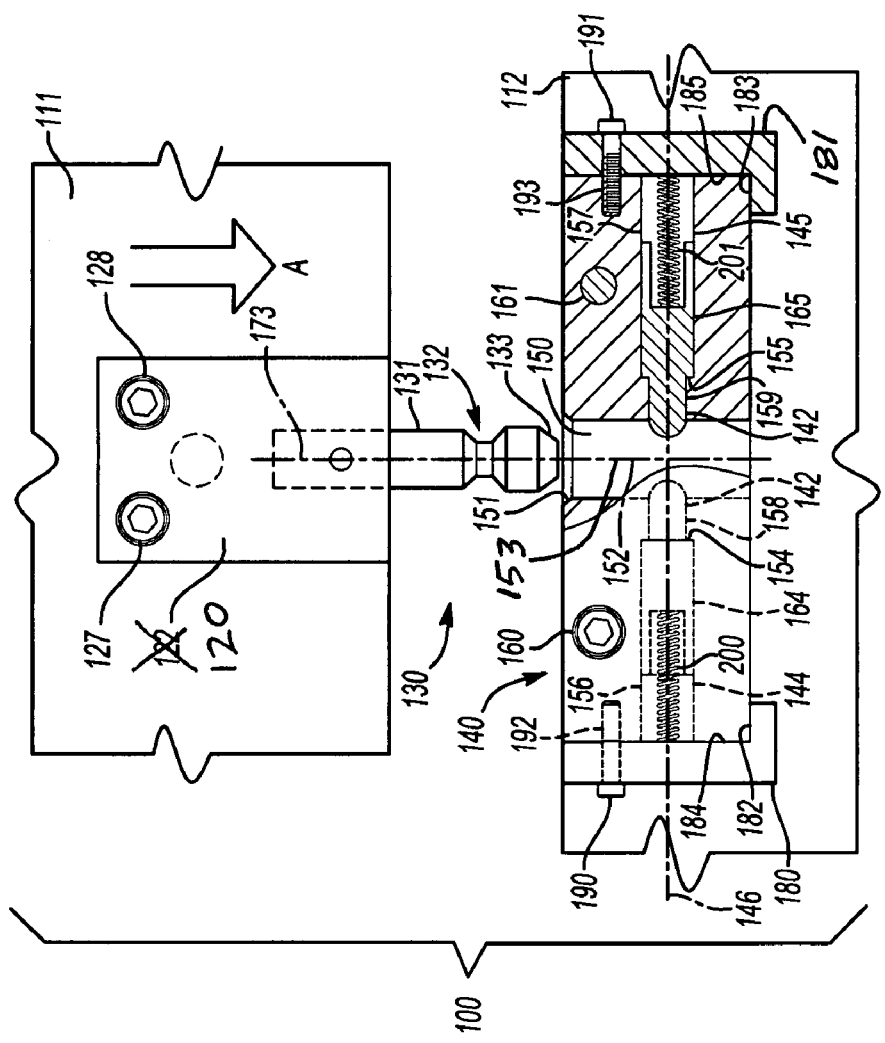
FIG. 3 is a partly-sectional front view of the present invention in an unlocked position.

Referring to FIGS. 3-5, the present invention is a locking device for two or more plate-like components of an injection molding machine. These plate-like components include, for example, two mold plates 111, 112 (which may have core and cavity inserts—not shown) that are used to form a desired injection molded component. Locking device 100 is comprised of base 140 having longitudinal axis (not shown) and vertical axis 153. Base 140 is made of a metal such as steel or aluminum, and various alloys thereof, which are sufficiently wear-resistant to have an extended life in a continuous-use, manufacturing environment. Base 140 is mounted on lower mold plate 112. This is accomplished via socket head cap screws 160, 161 which fit inside countersunk clearance holes 147 of the base. The cap screws are then tightened appropriately. Base 140 has first bore 142 extending therethrough which is substantially parallel to the longitudinal axis. First bore 142 can be a substantially round hole, or any of various other geometries including substantially oval, substantially square and substantially rectangular. If the first bore is substantially round, then substantially round counterbore 144 in coaxial relationship with first bore 142 is included. A corresponding counterbore 145 is also shown in FIG. 3, as locking device 100 may be alternately constructed using multiple sets (or multiple subsets) of working components. As shown in FIG. 3, the locking device or die lock may be constructed using two such sets in substantially symmetric relationship, however this is only one of various arrangements that could be devised to carry out the objects of the present invention. If the first bore is not substantially round, then a counterbore (not shown) of the same generic geometry in coaxial relationship with the first bore, and having the function of substantially round counterbore 144 described further herein, is included.

Base 140 further includes second bore 150 extending therethrough which is substantially parallel to vertical axis 153. As with first bore 142, second bore 150 can be a substantially round hole, or any of various other geometries including substantially oval, substantially square and substantially rectangular. Second bore 150 may include chamfer 151.

First bore 142 has a first bore centerline 146, and the second bore 150 has a second bore centerline 152. The first bore centerline and second bore centerline intersect. The present invention also contemplates variations such that the centerlines substantially intersect, without seriously affecting the operation and performance of the invention. Furthermore, first and second bore centerlines may intersect substantially orthogonally, or at other selected angles such as, for example, about 80 degrees, about 70 degrees or about 60 degrees or less. Base 140 furthermore has sides 148, 149 that are spaced apart from vertical axis 153. Counterbores 144, 145 or other recesses (not shown) extend from their respective sides 148, 149 partway toward second bore centerline 152 so as to form abutting shoulders 154, 155 within base 140. Counterbores 144, 145 form counterbore walls 156, 157 within the base. First bore 142 forms first bore walls 158, 159 within the base.

Referring to FIG. 6, the present invention further includes an actuator or slide 164. A corresponding actuator 165 is also shown in FIG. 3, as locking device 100 may be alternately constructed using multiple sets (or multiple subsets) of working components, as stated above. The actuator can be a substantially round, or any of various other geometries including substantially oval, substantially square and substantially rectangular. Actuator 164 is made of a metal such as steel or aluminum, and various alloys thereof, which are sufficiently wear-resistant to have an extended life in a continuous-use, manufacturing environment. One preferred material for the actuator is oil-hardened tool steel. Actuator 164 has first and second portions 166, 167 respectively. First portion 166 has a first selected cross-sectional area, and second portion 167 has a second selected cross-sectional area, wherein the first selected cross-sectional area is less than the second selected cross-sectional area. In one embodiment, first portion 166 has a first selected diameter and second portion 167 has a second selected diameter. The first selected diameter is less than the second selected diameter, therefore shoulder 168 is formed at the interface between first and second portions 166, 167. First and second portions can also have other geometries besides substantially round, including substantially oval, substantially square and substantially rectangular. First and second portions are typically, but not necessarily, in substantially coaxial relationship.

Actuator 164 furthermore has first and actuator second ends 170, 171 in opposing relationship. Actuator first end 170 has a substantially curved surface 172 which is substantially convex or substantially protuberant in nature. In one embodiment the substantially curved surface 172 is substantially hemispherical in nature, although other geometries are also contemplated by the present invention, including ellipsoid, ovaloid, etc. For the embodiment of FIGS. 3-4, when actuator 164 is assembled within base 140, first portion 166 is located within bore 142 and second portion 167 is within counterbore 144. Typically second portion 167 is in sliding communication with counterbore wall 156. First portion 166 may be in sliding communication with first bore wall 158.

The present invention further includes member 180. A corresponding member 181 is also shown in FIGS. 3 and 5, as locking device 100 may be alternately constructed using multiple sets (or multiple subsets) of working components, as stated above. Member 180 is made of a metal such as steel or aluminum, and various alloys thereof, which are sufficiently wear-resistant to have an extended life in a continuous-use, manufacturing environment. Member 180 at least partly covers first bore 142, substantially enclosing counterbore 144. Member 181 at least partly covers first bore 142, substantially enclosing counterbore 145. Means for attaching members 180, 181 to the base may also be supplied, such as by screws 190, 191, which thread into threaded bores 192, 193, via clearance holes 186, 187, in members 180, 181, respectively. Alternatively, other means for connecting may be provided, such as welding, pinning, riveting, staking, tongue-and-groove, or other means of semipermanently or permanently joining the member to the base. When the member is connected to the side via its appropriate means, the member may, or may not, be in contact with the side. The members may comprise first surfaces, 182, 183, and second surfaces, 184, 185, respectively, wherein the first surfaces and respective second surfaces are substantially perpendicular, further wherein the first and second second surfaces abut the base so as to substantially retain the position of the member with respect to the first bore and respective counterbore, preventing rotation of the member and subsequent loss of spring tension on the actuator.

Biasing element 200 is located within counterbore 144 between actuator second end 171 and member 180. The biasing element may be a helical spring. A corresponding biasing element 201 is also shown in FIG. 3, as locking device 100 may be alternately constructed using multiple sets (or multiple subsets) of working components. Biasing element 200 may or may not be preloaded when fully assembled within the locking device. This magnitude of preloading is a factor which affects the force at which the present invention unlocks (or unlatches). When the biasing element is at least partially compressed or preloaded it urges the actuator toward the second bore centerline.

When the biasing element is not at least partially compressed or preloaded it does not urge the actuator toward the second bore centerline. However, in this case the biasing element does act to restore the actuator to a position in which the actuator first end protrudes into the second bore after the actuator first end has been substantially displaced out of the second bore by projection 130.

In another embodiment, referring to FIG. 6, actuator second end 171 further comprises blind bore 202 extending therefrom into second portion 167, blind bore 202 forming inner end wall 203 within the second portion. First portion 166, second portion 167 and blind bore 202 are typically, but not necessarily, in substantially coaxial relationship. Furthermore, the first portion is within first bore 142 and the second portion is within counterbore 144, with biasing element 200 constrained by inner end wall 203 and member 180.

The locking device further comprises block 120, socket head cap screws 127, 128, for mounting block 120 on upper mold plate 111 and projection 130. The block and projection are made of a metal such as steel or aluminum, and various alloys thereof, which are sufficiently wear-resistant to have an extended life in a continuous-use, manufacturing environment. Projection 130 has first and second projection ends 131, 133 and projection longitudinal axis 173. First projection end 131 is located proximally with respect to block 120 and is substantially rigidly connected to it. Second projection end 133 is located distally with respect to block 120 and fits within second bore 150 during at least part of the injection molding machine cycle. Second projection end 133 has elongated groove 132 and a taper. In one embodiment, referring to FIG. 8, elongated groove 132 has surface 139 with substantially straight portion 214. Referring to FIGS. 9-10, substantially straight portion 214 is substantially at a selected angle from projection longitudinal axis 173. This angle may be an oblique angle. Actuator first end 170 is in contact with surface 139 when the locking device is in a locked position. The selected angle affects the force at which the locking device unlocks. As the selected angle increases for a particular embodiment of the present invention, the unlocking force also increases. In one embodiment, the selected angle is from about 40 degrees to about 50 degrees. In another embodiment, the selected angle is from about 30 degrees to about 60 degrees. In another embodiment, the selected angle is from about 20 degrees to about 70 degrees. In another embodiment, referring to FIG. 19, the elongated groove has surface 239 with a substantially nonstraight/curved/arcuate portion.

With respect to location of the base on the lower mold plate, FIGS. 14-14A apply to the embodiment shown in FIGS. 3-5 as follows: To assist with proper location of the base on the lower mold plate, blind recess 215 in a back surface of the base is aligned with and fits over corresponding locating pin 217, previously installed on an edge of the lower mold plate. During installation of the base, the locating pin is received by the blind recess.

Referring to FIGS. 15-18, a locking device for first and second mold plates of an injection molding machine is disclosed, comprising a base 230 attached to the first mold plate, the base having a bore 231 and a channel 232 extending therethrough, the bore and the channel having first and second centerlines, 233, 234, respectively, wherein the first centerline substantially intersects the second centerline. An actuator 235 has an actuator first end 236, wherein actuator 235 is within channel 232. A corresponding actuator 251 is also shown in FIGS. 16-18, as locking device 250 may be alternately constructed using multiple sets (or multiple subsets) of working components. As shown in FIGS. 16-18, the locking device or die lock may be constructed using two such sets in substantially symmetric relationship, however this is only one of various arrangements that could be devised to carry out the objects of the present invention. A carrier 237 for actuator 235 at least partly covers channel 232. A biasing element 238 is located between the actuator and the carrier. Similarly to FIGS. 3-8, a block (not shown) is attached to the second mold plate, the block having a projection (not shown) with projection first and second ends 341, 342, and a projection longitudinal axis 243, wherein projection first end 341 is substantially rigidly connected to the block, wherein projection second end 342 fits within the bore, the projection second end comprising a projection contact surface (not shown).

The actuator may have sides 252, 253 which are in sliding communication with channel 232. Furthermore, actuator first end 236 is substantially convex. Furthermore, the actuator may have concave surface 254 in which the biasing element can nest, which may permit a smaller package size to be designed for the die lock. Actuator 235 has wall 255 which is substantially perpendicular to the longitudinal axis of the actuator. The biasing element may be captured between the wall and the carrier as shown in FIG. 18.

FIG. 15 is an isometric view for the embodiment of FIGS. 16-18 in a working environment (and in an unlocked position). Base 230 is attached to lower mold plate 312. Block 320 having projection 330 is attached to upper mold plate 311.

Referring again to FIGS. 3-5, base 140, block 120 and/or projection 130 may alternatively be made of a metal such as cast iron, and various alloys thereof, which are sufficiently wear-resistant to have an extended life in a continuous-use, manufacturing environment. One preferred material for base 140 and block 120 is cold-rolled, SAE grade 1018 steel. One preferred material for the latch pin or projection is oil-hardened "06" or "01" tool steel. One preferred material for actuator 164 is oil-hardened "06" or "01" tool steel. One preferred biasing element is an "extra heavy duty die spring" having a ⅜ inch hole diameter and 1 inch free length, part number 106104000, commercially available from Associated Spring/Raymond, "BARNES" Group, Inc. of Maumee, Ohio, USA.

The locking device or die lock may be constructed using one set (or one subset) of the working components described herein to carry out the objects of the present invention.

In a preferred embodiment, elongated groove 132 of projection 130 has a minimum cross section region 284 (see FIG. 8) which can extend about 0.078 inch above and about 0.078 inch below the elongated groove centerline. A preferred radius for hemispherical curved surface 172 of actuator 170 is 0.156 inch.

Referring to FIGS. 16-18, No. 8 socket head allen screws (0.165 inch diameter) are used to attached carrier 237 to base 230.

For purposes of this detailed description of the invention, "substantially intersect/substantially intersects" (for the centerlines of the first and second bores of a base) is defined to include when the centerlines: 1. actually intersect, and 2. do not, in fact, actually intersect, but rather come within a short distance of each other. In one embodiment, the short distance can be 0.125 inches or less. In another embodiment, the short distance can be 0.25 inches or less. The geometries of the working components described herein can be inherently tolerant of bore centerlines which substantially intersect. For example, a hemispherical curved surface of an actuator can have adequate contact with an elongated groove of a projection for normal operation of the invention despite some misalignment of the bore centerlines. Alternatively, the geometries of the working components can be specifically designed to produce centerlines which substantially intersect.

Referring to FIGS. 3-20, means are disclosed for preloading the projection in-line with the projection longitudinal axis after the projection is substantially fully inserted into the second bore and before a load is applied to the locking device due to the first and second mold plates moving together.

Referring to FIGS. 7A-7C, a sequence of operation for two components of the mold base hold retainer is shown. In FIG. 7A, the projection has entered the second bore of the base as the first and second mold plates are coming together during an injection molding cycle. Arrow G indicates the direction of travel for the projection relative to the base. Arrow G indicates the same direction of travel for the projection relative to the base as the direction of travel (see arrow A) for the upper mold plate in FIG. 3. In FIG. 7A the taper of the projection has made initial contact with the actuator first end. Prior to contact with the projection, the actuator first portion extends into the second bore about 0.09 to about 0.11 inch. In FIG. 7B the force created by the vertical displacement of the projection into the second bore has displaced the actuator longitudinally within the base away from the second bore centerline (in the direction of arrow H). In this condition the upper and lower mold plates continue to come together. In FIG. 7C, the mold plates have come substantially into contact with each other. The injection molding machine is ready for molten material to be injected into the die cavity (not shown). The actuator first end has been displaced into the elongated groove by the restoring force of the biasing element in the direction of arrow I. Referring to FIG. 8, note that substantially localized area 210 of projection contact surface 139 is in contact with actuator first end 170. For purposes of general description, this substantially localized area 210 is a place of "point contact" by the actuator first end. However, when examined at a microscopic level, the actual contact exists over a wider area, and not at one point. But the contact may still be accurately described as occurring at a single substantially localized area. Also note that the contact occurs at the portion of the elongated groove which is distal to the block (not shown). In this "locked" position, the actuator does not contact the portion of the elongated groove which is proximal to the block. The geometry of the elongated groove or projection contact surface does not substantially conform to the geometry of the actuator first end. The geometry of the projection contact surface causes the axial force of the biasing element (not shown) acting through the actuator to create a vertical component of force on the projection, which tends to urge the projection further into the second bore of the base. After the projection is substantially fully inserted into the second bore and before a load is applied to the locking device due to the first and second mold plates moving together, the projection is preloaded in-line with the projection longitudinal axis. This carries out an object of the invention, which is to provide a tensilely preloaded engagement of the projection after the device locks and before the locked mold plates begin moving in the opposite direction, so that "play" in the device is minimized, and that the mold plates are held together more securely than when an actuator engages a groove without tensiley preloading its projection.

Referring to FIG. 9, a first locked position for the invention is shown, wherein imaginary line 211 (in the plane of the first and second bore centerlines and aligned with substantially straight portion 214) is at first oblique angle C with respect to projection longitudinal axis 173. In one preferred embodiment, angle C is about 50 to about 60 degrees, and the load on the projection to unlock the invention in this range for angle C is believed to be about 250 to about 350 pounds. In the first locked position, first distance $L_1$ is shown between elongated groove centerline 212 and actuator centerline 213, i.e. the actuator centerline is offset from the elongated groove centerline. After the projection is substantially fully inserted into the second bore and before a load is applied to the locking device due to the first and second mold plates moving together, the actuator first end contacts the elongated groove at a selected distance from the elongated groove centerline. M is a first distance between the projection longitudinal axis and the actuator shoulder. The geometries of actuator first end 170, first oblique angle C, the elongated groove and first bore (within the base) are factors which affect M. Referring to FIG. 10, a second locked position for the invention is shown, wherein imaginary line 211 is at second oblique angle D with respect to projection longitudinal axis 173. In the second locked position, first distance $L_1$ is substantially the same as in FIG. 9 because the geometries of the elongated groove centerline, first bore, etc. are unchanged for the two positions. However in FIG. 10, second distance N between the longitudinal axis and shoulder is greater than first distance M due to the substantially straight portion of the elongated groove thrusting the actuator further away from longitudinal axis 173 than in FIG. 9.

Referring to FIGS. 11-12, another embodiment of the invention is shown. FIG. 11 is an exploded view of the back of the base and associated components. Base 264 comprises first bore 226 which is substantially parallel to the longitudinal axis (not shown) of the base. First bore 226 is at least partially threaded at 270. Base 264 further comprises rectangular bore 228 for receiving rectangular projection 229, although other shapes are contemplated for the bore and projection as described elsewhere herein. Rectangular projection 229 has substantially semicircular groove 263. The base is attached to a mold plate using fasteners (not shown) which extend through base mounting holes 227. Actuators 223 each have substantially concave first ends 265 and substantially flat second ends 266. The actuators are received by internal slots 218 which are open to back 216 of base 264. The actuators are in sliding communication with the internal slots and the mold plate. Internal slots 218 are aligned with first bore 226, and intersect both first bore 226 and rectangular bore 228. Nearest the second bore centerline, the internal slots substantially conform to the actuator first ends. Furthermore, the internal slots guide the axial displacement of actuators 223 substantially in-line with first bore centerline 269 during movement of the rectangular projection into and out of the rectangular bore. Each actuator has threaded bore 224, for threadably receiving first end 260 of set screw 219 after the actuator has been placed within one of the internal slots. Various threaded pins with plain ends at 261, or pins which press-fit into the actuators, are contemplated for use in place of set screws.

Upon installing the set screw securely into the threaded bore by engaging a tool in the hexagonal recess at 261, biasing element 221 is inserted into the first bore and fitted over the set screw. The set screw acts as a guide to minimize nonaxial deformation of the biasing element. It also helps to keep the biasing element's force applied normally to the central part of the substantially flat second end, to minimize cocking and jamming of an actuator within an internal slot. Adjustment screw 220 having lock nut 222 is threaded into the first bore, so that the biasing element is constrained between first end 262 of the adjustment screw and substantially flat second end 266 of the actuator. (Note: a member such as a screw similar to 220, with or without the adjustment capability, and fitting into a threaded counterbore, may be used to constrain the biasing element. Other means of constraining the biasing element within the base, between the actuator and the member, include: welding a plate over the counterbore, applying a weldment over the counterbore (plug welding), etc.) The adjustment screw can be threaded into the first bore sufficiently so that a preload can be applied to the biasing element, if desired. When the desired preload (if any) is reached, the adjustment screw is retained in position by tightening lock nut 222 against the base. In operation, when rectangular projection 229 enters rectangular bore 228 sufficiently, taper 267 of the projection begins to displace the actuators away from second bore centerline 268. A sequence of operation for the components of the mold base hold retainer similar to that of FIGS. 7A-7C begins. However because, in this case, the radius of the actuator first end R is substantially the same as the radius of semicircular groove 263, the actuator engages the projection without tending to draw it further into the second bore (i.e. without preloading the projection). A projection with a projection contact surface like other embodiments of the invention described herein is also contemplated for use with this embodiment.

To assist with proper location of base 264 on a mold plate, blind recess 225 in back surface 216 of the base is aligned with and fits over a corresponding locating pin (not shown), previously installed on an edge of the mold plate. During installation of the base, the locating pin is received by the blind recess.

Referring to FIGS. 13-14A, a variation of the embodiment of FIGS. 11-12 is shown. In this variation, actuator 273 does not have a set screw received in it. Instead, biasing element 271 is constrained between first end 272 of adjustment screw 280 and substantially flat second end 276 of the actuator, without a set screw to act as a guide for the biasing element. This reduces the cost and complexity of the die lock where cocking and jamming of the actuator within an internal slot are not signficant concerns.

FIG. 14 is a sectional view for the embodiment of FIG. 13 as seen along line 14-14 from within one of the internal slots 278. Biasing element 271 acts on the central part of substantially flat second end 276 of actuator 273. Furthermore, the actuator is in sliding communication with one of the internal slots 278 and mold plate 277.

FIG. 14A is a sectional view for the embodiment of FIG. 13 as seen along line 14A-14A from within rectangular bore 275. Internal slots 278 are aligned with first bore 279, and intersect both the first bore and the rectangular bore. Means for locating base 274 (blind recess 215) is also shown.

Figure 19:
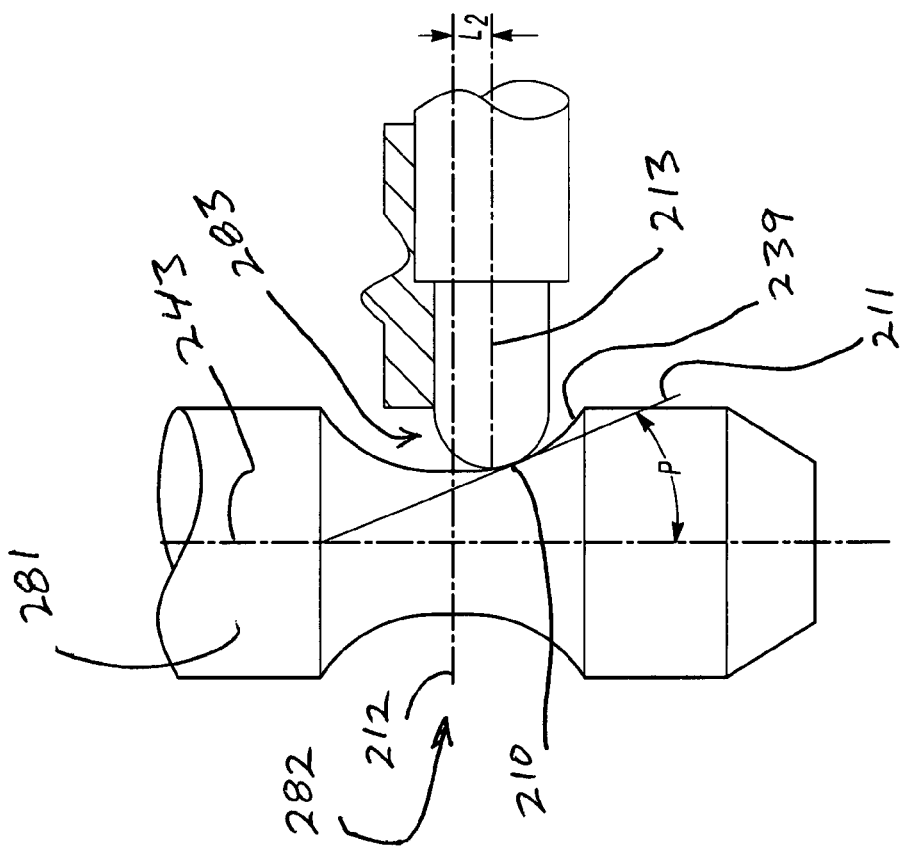
FIG. 19 is an enlarged partly-sectional side view for selected components for yet another embodiment of the present invention in a locked position.

In one embodiment, referring to FIG. 19, elongated groove 282 of projection 281 has projection contact surface 239 with substantially localized area of projection contact surface 210. A locked position for the invention is shown in FIG. 19, wherein imaginary line 211 (in the plane of the first and second bore centerlines, not shown, and tangent to projection contact surface 239 at substantially localized area 210) is at selected angle P with respect to projection longitudinal axis 243. Angle P is shown in FIG. 19 as an acute angle. However the angle between longitudinal axis 243 and imaginary line 211 could be measured from a point on the longitudinal axis near the block (not shown) as an obtuse angle. To address both situations, angle P may be described generally as an oblique angle. An imaginary line tangent to the projection contact surface anywhere within the substantially localized area is substantially at an oblique angle to the projection longitudinal axis. In the locked position shown, $L_2$ is the distance between elongated groove centerline 212 and actuator centerline 213. Actuator first end 283 contacts projection contact surface 239 at substantially localized area 210. The geometries of the components which determine selected angle P affect the force at which the locking device unlocks. As angle P increases for this embodiment of the present invention, the unlocking force also increases. In one embodiment, oblique angle P is from about 40 degrees to about 50 degrees. In another embodiment, the selected angle is from about 30 degrees to about 60 degrees. In another embodiment, the selected angle is from about 5 degrees to about 80 degrees.

Referring again to FIG. 19, substantially localized area 210 of projection contact surface 239 contacts actuator first end 283. Note that the contact occurs at the portion of the elongated groove which is distal to the block (not shown). In this "locked" position, the actuator does not contact the portion of the elongated groove which is proximal to the block. The geometry of the projection contact surface causes the axial force of the biasing element (not shown) acting through the actuator to create a vertical component of force on the projection, which tends to urge the projection further into the second bore of the base. After the projection is substantially fully inserted into the second bore and before a load is applied to the locking device due to the first and second mold plates moving together, the projection is preloaded in-line with the projection longitudinal axis. This carries out an object of the invention, which is to provide a tensilely preloaded engagement of the projection after the device locks and before the locked mold plates begin moving in the opposite direction, so that "play" in the device is minimized, and that the mold plates are held together more securely than when an actuator engages a groove without tensiley preloading its projection.

Figure 20:
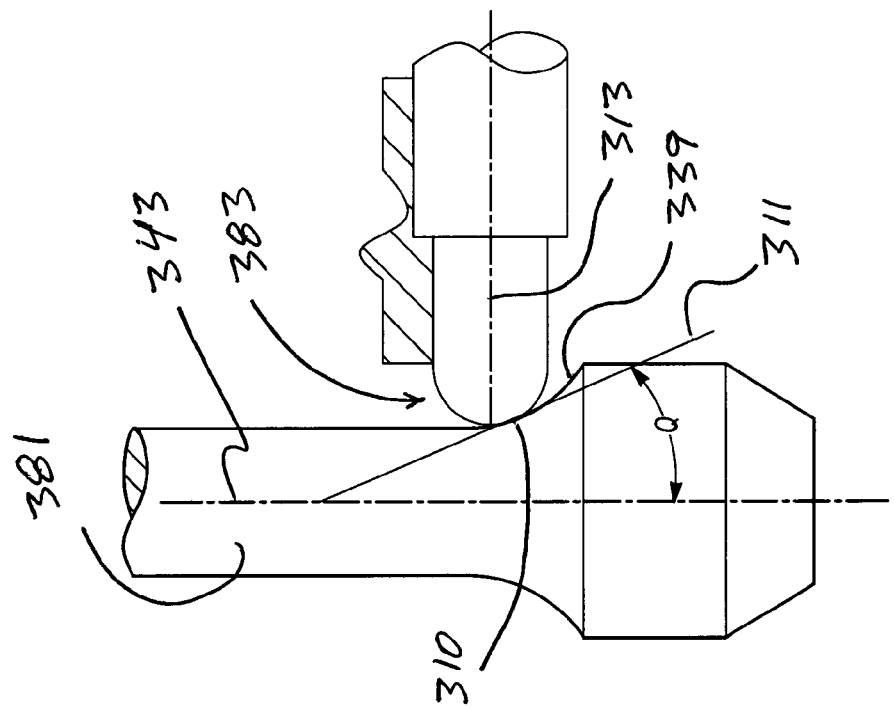
FIG. 20 is an enlarged partly-sectional side view for selected components for yet another embodiment of the present invention in a locked position.

In another embodiment, referring to FIG. 20, projection 381 has projection contact surface 339 with substantially localized area of projection contact surface 310. Projection 381 does not have an elongated groove in the same sense used elsewhere herein, i.e. a radial slot located distally with respect to a block (not shown) on a projection. Therefore projection 381 also does not have an elongated groove centerline. A locked position for the invention is shown in FIG. 20, wherein imaginary line 311 (in the plane of the first and second bore centerlines, not shown, and tangent to projection contact surface 339 at substantially localized area 310) is at selected angle Q with respect to projection longitudinal axis 343. Angle Q is shown in FIG. 20 as an acute angle. However the angle between longitudinal axis 343 and imaginary line 311 could be measured from a point on the longitudinal axis near the block (not shown) as an obtuse angle. To address both situations, angle Q may be described generally as an oblique angle. An imaginary line tangent to the projection contact surface anywhere within the substantially localized area is substantially at an oblique angle to the projection longitudinal axis. Actuator first end 383 contacts projection contact surface 339 at substantially localized area 310. The geometries of the components which determine selected angle Q affect the force at which the locking device unlocks. As angle Q increases for this embodiment of the present invention, the unlocking force also increases. In one embodiment, oblique angle Q is from about 40 degrees to about 50 degrees. In another embodiment, the selected angle is from about 30 degrees to about 60 degrees. In another embodiment, the selected angle is from about 5 degrees to about 80 degrees.

Referring again to FIG. 20, substantially localized area 310 of projection contact surface 339 contacts actuator first end 383. The geometry of the projection contact surface causes the axial force of the biasing element (not shown) acting through the actuator to create a vertical component of force on the projection, which tends to urge the projection further into the second bore of the base. After the projection is substantially fully inserted into the second bore and before a load is applied to the locking device due to the first and second mold plates moving together, the projection is preloaded in-line with the projection longitudinal axis. This carries out an object of the invention, which is to provide a tensilely preloaded engagement of the projection after the device locks and before the locked mold plates begin moving in the opposite direction, so that "play" in the device is minimized, and that the mold plates are held together more securely than when an actuator engages a groove without tensiley preloading its projection.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A locking device for first and second mold plates of an injection molding machine, comprising:
   a base attached to the first mold plate, the base having first and second bores extending therethrough, the first and second bores having first and second bore centerlines, respectively, wherein the first bore centerline substantially intersects the second bore centerline;
   an actuator having an actuator first end, wherein the actuator is within the first bore;
   a member which at least partly covers the first bore;
   a biasing element between the actuator and the member; and
   a block attached to the second mold plate, the block having a projection with projection first and second ends and a projection longitudinal axis, wherein the projection first end is substantially rigidly connected to the block, wherein the projection second end fits within the second bore, the projection second end comprising a projection contact surface;
   the projection second end comprising an elongated groove having an elongated groove centerline, further wherein, after the projection is substantially fully inserted into the second bore and before a load is applied to the locking device due to the first and second mold plates moving together, the actuator first end contacts the elongated groove at a selected distance from the elongated groove centerline.

2. A locking device for first and second mold plates of an injection molding machine, comprising:
   a base attached to the first mold plate, the base having first and second bores extending therethrough, the first and second bores having first and second bore centerlines, respectively, wherein the first bore centerline substantially intersects the second bore centerline;
   an actuator having an actuator first end, wherein the actuator is within the first bore;
   a member which at least partly covers the first bore;
   a biasing element between the actuator and the member; and
   a block attached to the second mold plate, the block having a projection with projection first and second ends and a projection longitudinal axis, wherein the projection first end is substantially rigidly connected to the block, wherein the projection second end fits within the second bore, the projection second end comprising a projection contact surface;
   the projection second end comprising an elongated groove having an elongated groove centerline, the actuator further having an actuator centerline, wherein the actuator centerline is offset from the elongated groove centerline.

3. The locking device of claim 1, the first bore further comprising a counterbore, wherein the counterbore extends away from the second bore centerline, the actuator further having first and second portions, wherein the first portion is within the first bore and the second portion is within the counterbore, further wherein the member at least partly covers the counterbore;
   the actuator further having an actuator second end in opposing relationship with the actuator first end, wherein the actuator second end comprises a blind bore extending therefrom at least partially into the second portion, wherein the blind bore forms an inner end wall within the second portion, further wherein the biasing element is between the inner end wall and the member.

4. A locking device for first and second mold plates of an injection molding machine, comprising:
- a base attached to the first mold plate, the base having a bore and a channel extending therethrough, the bore and the channel having first and second centerlines, respectively, wherein the first centerline substantially intersects the second centerline;
- an actuator having an actuator first end, wherein the actuator is within the channel;
- a carrier for the actuator which at least partly covers the channel;
- a biasing element between the actuator and the carrier; and
- a block attached to the second mold plate, the block having a projection with projection first and second ends and a projection longitudinal axis, wherein the projection first end is substantially rigidly connected to the block, wherein the projection second end fits within the bore, the projection second end comprising a projection contact surface;
- the projection second end comprising an elongated groove having an elongated groove centerline, further wherein, after the projection is substantially fully inserted into the bore and before a load is applied to the locking device due to the first and second mold plates moving together, the actuator first end contacts the elongated groove at a selected distance from the elongated groove centerline.

5. The locking device of claim 4, wherein the actuator has sides which are in sliding communication with the channel, further wherein the actuator first end is substantially convex.

6. The locking device of claim 4, wherein the projection contact surface does not substantially conform to the actuator first end.

7. The locking device of claim 4, further wherein, after the projection is substantially fully inserted into the bore and before a load is applied to the locking device due to the first and second mold plates moving together, the projection is preloaded in-line with the projection longitudinal axis.

8. The locking device of claim 4, further wherein, after the projection is substantially fully inserted into the bore and before a load is applied to the locking device due to the first and second mold plates moving together, the actuator first end contacts a substantially localized area of the projection contact surface.

9. The locking device of claim 8, wherein an imaginary line in a plane containing the first and second centerlines, and tangent to the projection contact surface anywhere within the substantially localized area, is substantially at an oblique angle to the projection longitudinal axis.

10. The locking device of claim 4, the projection contact surface having a substantially straight portion, wherein the substantially straight portion is substantially at an oblique angle to the projection longitudinal axis.

11. The locking device of claim 1, further wherein, after the projection is substantially fully inserted into the second bore and before a load is applied to the locking device due to the first and second mold plates moving together, the projection is preloaded in-line with the projection longitudinal axis.

12. The locking device of claim 1, further wherein, after the projection is substantially fully inserted into the second bore and before a load is applied to the locking device due to the first and second mold plates moving together, the actuator first end contacts a substantially localized area of the projection contact surface;
- wherein an imaginary line in a plane containing the first and second bore centerlines, and tangent to the projection contact surface anywhere within the substantially localized area, is substantially at an oblique angle to the projection longitudinal axis.

13. The locking device of claim 1, the actuator first end having a substantially protuberant surface.

14. The locking device of claim 1, the projection contact surface having a substantially straight portion, wherein the substantially straight portion is substantially at an oblique angle to the projection longitudinal axis.

15. The locking device of claim 1, wherein the first bore forms an internal slot within the block adjacent the second bore and substantially in-line with the first bore, wherein the internal slot intersects the second bore and receives the actuator.

16. The locking device of claim 1, the actuator further having means for minimizing nonaxial deformation of the biasing element.

17. The locking device of claim 2, further wherein, after the projection is substantially fully inserted into the second bore and before a load is applied to the locking device due to the first and second mold plates moving together, the projection is preloaded in-line with the projection longitudinal axis.

18. The locking device of claim 2, further wherein, after the projection is substantially fully inserted into the second bore and before a load is applied to the locking device due to the first and second mold plates moving together, the actuator first end contacts a substantially localized area of the projection contact surface;
- wherein an imaginary line in a plane containing the first and second bore centerlines, and tangent to the projection contact surface anywhere within the substantially localized area, is substantially at an oblique angle to the projection longitudinal axis.

19. The locking device of claim 2, the actuator first end having a substantially protuberant surface.

20. The locking device of claim 2, the projection contact surface having a substantially straight portion, wherein the substantially straight portion is substantially at an oblique angle to the projection longitudinal axis.

* * * * *